July 7, 1970  W. NISSEN  3,518,825

INDICATING DEVICE

Filed May 1, 1968  4 Sheets-Sheet 1

Inventor:
Walter Nissen
By Michael J. Striker
Attorney

July 7, 1970  W. NISSEN  3,518,825
INDICATING DEVICE

Filed May 1, 1968  4 Sheets-Sheet 2

Inventor:
Walter Nissen
By Michael S. Strieker
Attorney

July 7, 1970  W. NISSEN  3,518,825
INDICATING DEVICE
Filed May 1, 1968  4 Sheets-Sheet 3
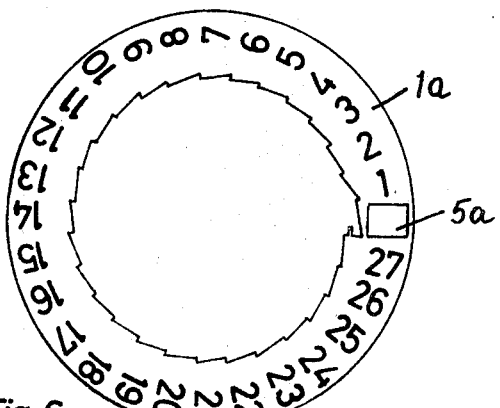
Fig. 6
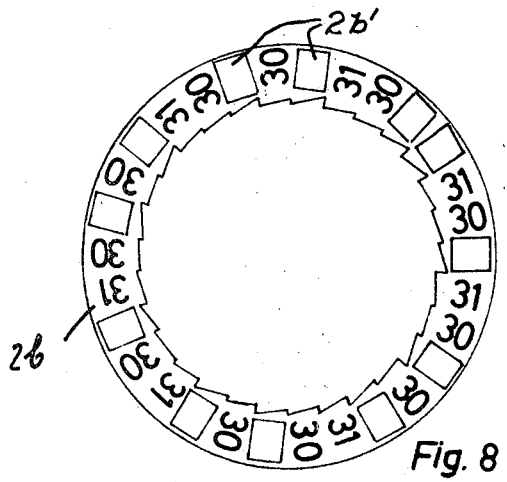
Fig. 8
Fig. 7
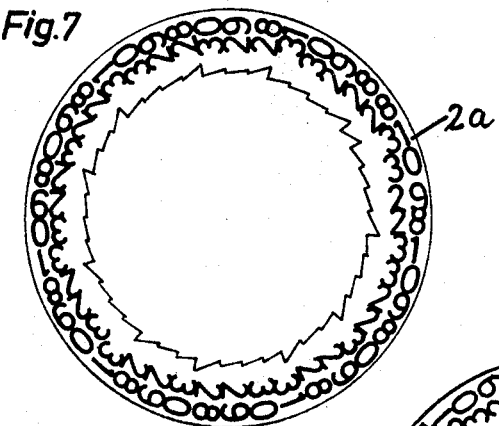
Fig. 9
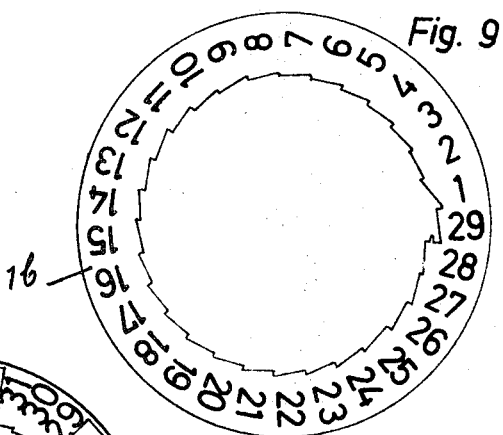
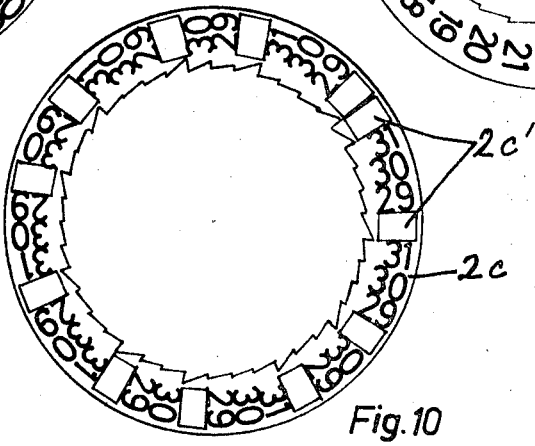
Fig. 10
Fig. 11
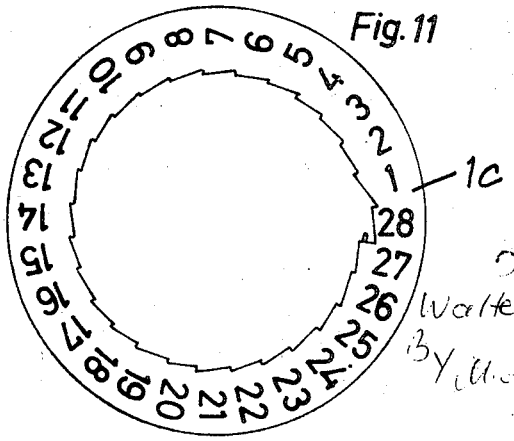
Inventor:
Walter Nissen
By Michael S. Striker
Attorney July 7, 1970        W. NISSEN        3,518,825
INDICATING DEVICE
Filed May 1, 1968        4 Sheets-Sheet 4
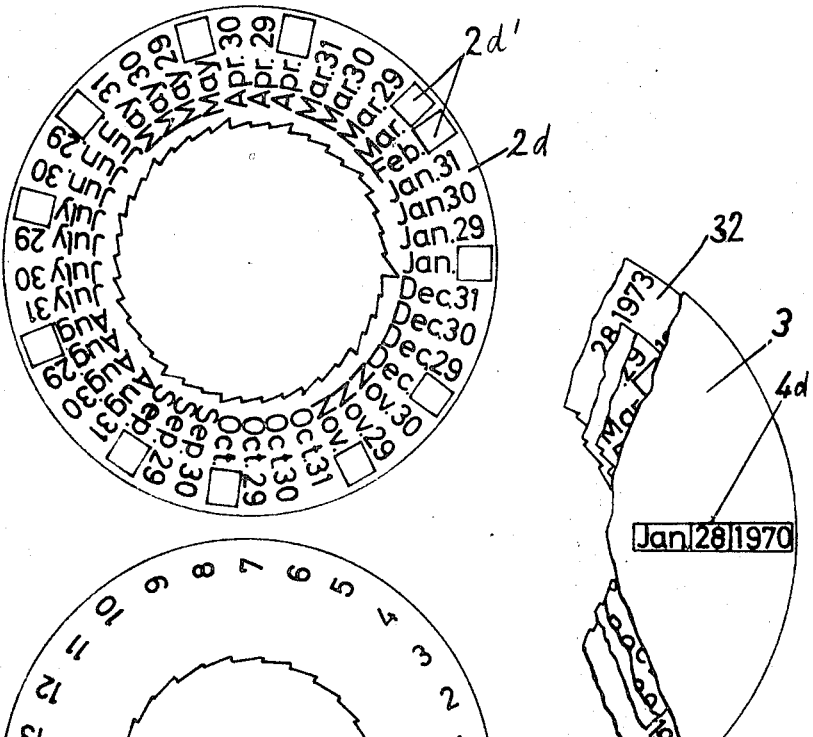
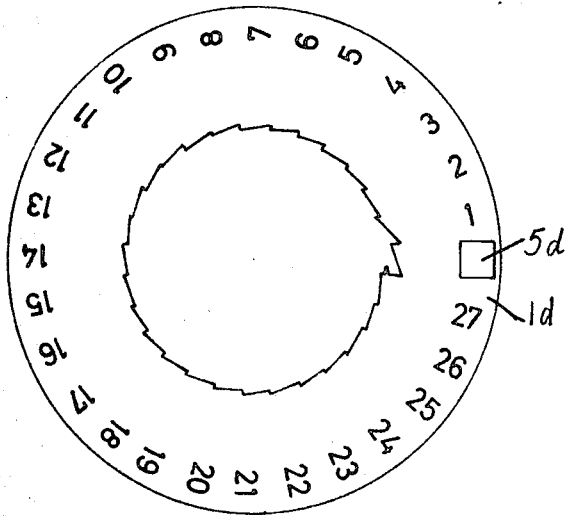
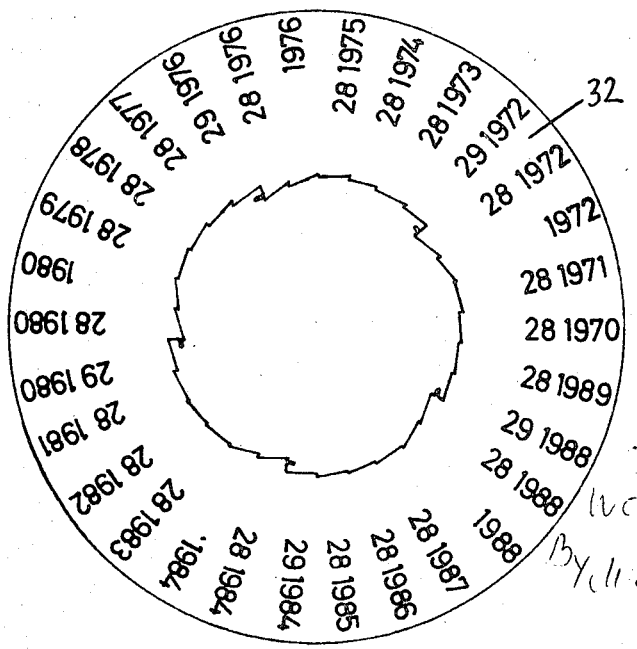
Fig. 12
Fig. 13
Fig. 14
Fig. 15
Inventor:
Walter Nissen
By Michael S. Striker
Attorney

United States Patent Office 3,518,825
Patented July 7, 1970

3,518,825
INDICATING DEVICE
Walter Nissen, 10 Brederscheid,
4307 Kettwig (Ruhr), Germany
Filed May 1, 1968, Ser. No. 725,591
Claims priority, application Germany, May 3, 1967,
N 30,454
Int. Cl. G04b 19/24
U.S. Cl. 58—4
16 Claims

ABSTRACT OF THE DISCLOSURE

An indicating device which includes a pair of endless carriers one of which is behind the other and both of which are mounted for advancement in a predetermined direction. First marking means is provided on the front carrier and represents a first series of successive values beginning with an initial value and ending with a terminal value. A window is provided in the front carrier at a location which is subsequent to the terminal value of the series. Second marking means is provided on the rear carrier and represents at least one additional value which constitutes the value following the terminal value of the series. Advancing means is associated with the carriers for intermittently advancing both of the same as a unit so that the values of the series on the front carrier successively arrive at an observation station, and for intermittently advancing only the rear carrier relative to the front carrier when the window in the latter arrives at the observation station so that the additional value on the rear carrier becomes observable through this window.

BACKGROUND OF THE INVENTION

The present invention relates generally to an indicating device, and more particularly to a date indicator.

Watches, clocks and other devices are already known wherein a date indicator is utilized. Thus, for instance, in watches it is known to provide a window in the dial, and to have a disc or annulus rotate behind this dial. The numbers 1–31 are successively provided in a ring-shaped configuration so that the respective numbers become visible in the window when the disc or annulus rotates in response to impulses transmitted to it by the watch works. Of course, this rotation is so effected that the disc or annulus advances incrementally, that is each day it will advance by a portion sufficient to bring the next-following number into registry with the window of the dial.

Such timepieces have been found to enjoy great popularity. They do, however, suffer from the disadvantage that they must be manually adjusted whenever the number of days of a given month is smaller than 31. In other words, if a month has only 30 days, then it is necessary to manually advance the timepiece on the 30th day so as to skip the setting which in another month would indicate the 31st day and to arrive thus at the setting for the first day of the new month. Similar adjustments are necessary in February where in a normal year it is necessary to skip three settings, namely the settings which would ordinarily indicate the 29th, 30th and 31st day, and in a leap year when February has 29 days, to skip the two settings which would otherwise indicate the 30th and 31st day.

Of course, the purpose of providing such date indicating arrangements in the first place is to assure that the wearer of the watch will be able at all times to ascertain reliably the date, in other words, these devices are intended to eliminate forgetfulness so as to assure that the owner, having once forgotten to change a manually operable date indicating device, will not be under a misapprehension as to the prevailing date when he subsequently seeks to ascertain this information. It follows, however, that if these automatically changing date-indicating devices require manual adjustment after all, and require such adjustment five times every year, they do not serve satisfactorily their intended purpose. At such times when these manual adjustments become necessary it is clearly still possible for the user to forget carrying-out of the adjustment. Furthermore, in many timepieces of the type here under discussion it is necessary that the winding stem be rotated until the hour hand has twice circled the dial before the date-indicating device will change to the next date. Thus, to skip even one day's indication it is necessary that the hour hand circle the dial four times and this is, of course, time-consuming. Furthermore, the wearer may overlook the fact that while he changes this setting, time is lost, and he may therefore set the timepiece itself on completion of the date adjustment to the same time which it indicated before the date adjustment was initiated. Under these circumstances the timepiece will of course indicate inaccurate time. Even if the wearer is aware that time has elapsed he may still not be immediately able to ascertain precisely how much time has passed and will be forced to set the timepiece more or less at random.

All of this is, of course, disadvantageous and a solution to the problems outlined has been considered desirable for a long time. No such solution has become known, however, until now.

It is thus a general object of the present invention to provide a device of the type here under discussion which is not subject to the disadvantages outlined above.

A more specific object of the invention is to provide such a device which will automatically compensate for differences in the number of days between given months and will thus always indicate the precise day of the month without any need for manual adjustments.

A further object of the invention is to provide such a device which can adjust not only for differences in the number of days of the months during ordinary years, but also during leap years.

A concomitant object of the invention is to provide such a device which will indicate not only the day of the month, but also the month itself.

Finally, it is yet a further object of the invention to provide a device of the type here under discussion which is also capable of indicating the prevailing year and which will automatically change this indication at the end of a year.

SUMMARY OF THE INVENTION

In accordance with one feature of my invention I provide, in a device of the type here under discussion, a pair of endless carriers one of which is behind the other and both of which are mounted for advancement in a predetermined direction; first working means provided on the other carrier and representing a first series of successive values beginning with an initial value and ending with a terminal value; a window provided in the other carrier at a location subsequent to the terminal value of the series; second marking means provided on the one carrier and representing at least one additional value which constitutes the value following the terminal value of the series; and advancing means associated with the carriers and being operative for intermittently advancing both of the carriers as a unit in the predetermined direction so that the values of the series on the other carrier successively arrive at an observation station, and for intermittently advancing only the one carrier in the direction relative to the other carrier in response to the window in the latter arriving at the observation station, whereby the additional value is observable through the window.

The novel features which are considered as characteristic for the invention are set forth in particular in the appended claims. The invention itself, however, both

BRIEF DESCRIPTION OF THE DRAWING

FIGS. 6 and 7 are plan views of two endless carriers in accordance with a further embodiment of my invention;

FIGS. 8 and 9 are views similar to FIGS. 6 and 7 but of endless carriers for yet a further embodiment of the invention;

FIGS. 10 and 11 are also views similar to FIGS. 6 and 7 but of endless carriers for an additional embodiment of the invention;

FIGS. 12–14 are also views similar to FIGS. 6 and 7 but showing three endless carriers for use in still another embodiment according to my invention; and FIG. 15 is a fragmentary plan view, partly broken away, illustrating the carriers of FIGS. 12–14 in assembled condition.

DESCRIPTION OF THE PREFERRED EMBODIMENTS

Figure 1:
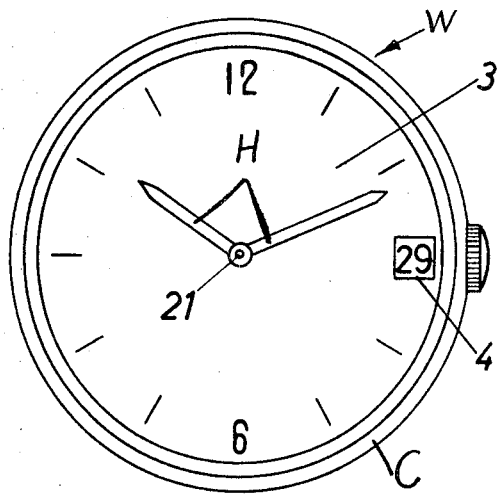
FIG. 1 is a top-plan view of a timepiece embodying my invention.

Discussing now the drawing in detail, and firstly FIG. 1 thereof, it will be seen that I have illustrated in this figure that the device according to my invention may be included in a timepiece such as a watch. It will be clear however, that it could also be included in a clock, or in a date-indicating device which has no time-indicating function at all.

The watch shown in FIG. 1 is generally identified with reference designation W and comprises a casing C and a dial 3. The hour hand and the minute hand, both of which are identified with reference designation H, are mounted in the usual manner on a shaft so as to be turnable about an axis of rotation 21. The dial 3 is provided with a window 4 through which a date indication, here the numeral 29 which indicates the 29th day of the month, is visible. The term window here and in all subsequent usage is intended to imply either a cut-out or a transparent or translucent portion, it being merely important that the date indication be visible through such window, not in what manner this is precisely accomplished.

Thus far, the watch W does not differ from what is known. Contrary to what is known, however, the watch W of FIG. 1 comprises a date-indicating device which utilizes not a single turnable disc or annulus as in known arrangements of this type, but instead the two endless carriers shown in FIGS. 2 and 3. One of these carriers is identified with reference to numeral 1 in FIG. 2 and the other is identified with reference numeral 2 in FIG. 3. In both cases they are shown as being constructed as annuli whose inner peripheral edge or inner circumferential marginal portion is provided with teeth in the manner which will be discussed. However, it could also be the outer peripheral edge which is toothed, just as the carriers 1 and 2 could be provided as discs rather than as annuli.

Figure 2:
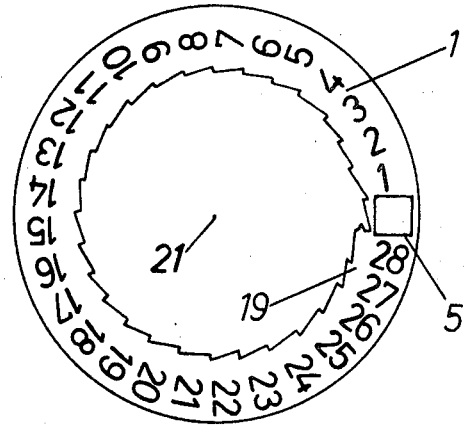
FIGS. 2 and 3 are respectively top-plan views of two endless carriers which are together used in one embodiment of my invention.
Figure 3:
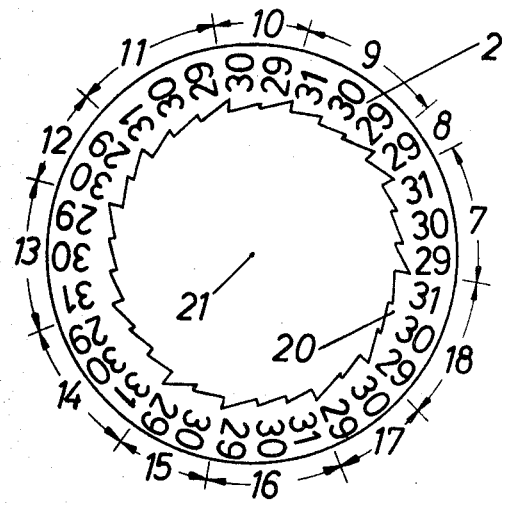
Figure 4:
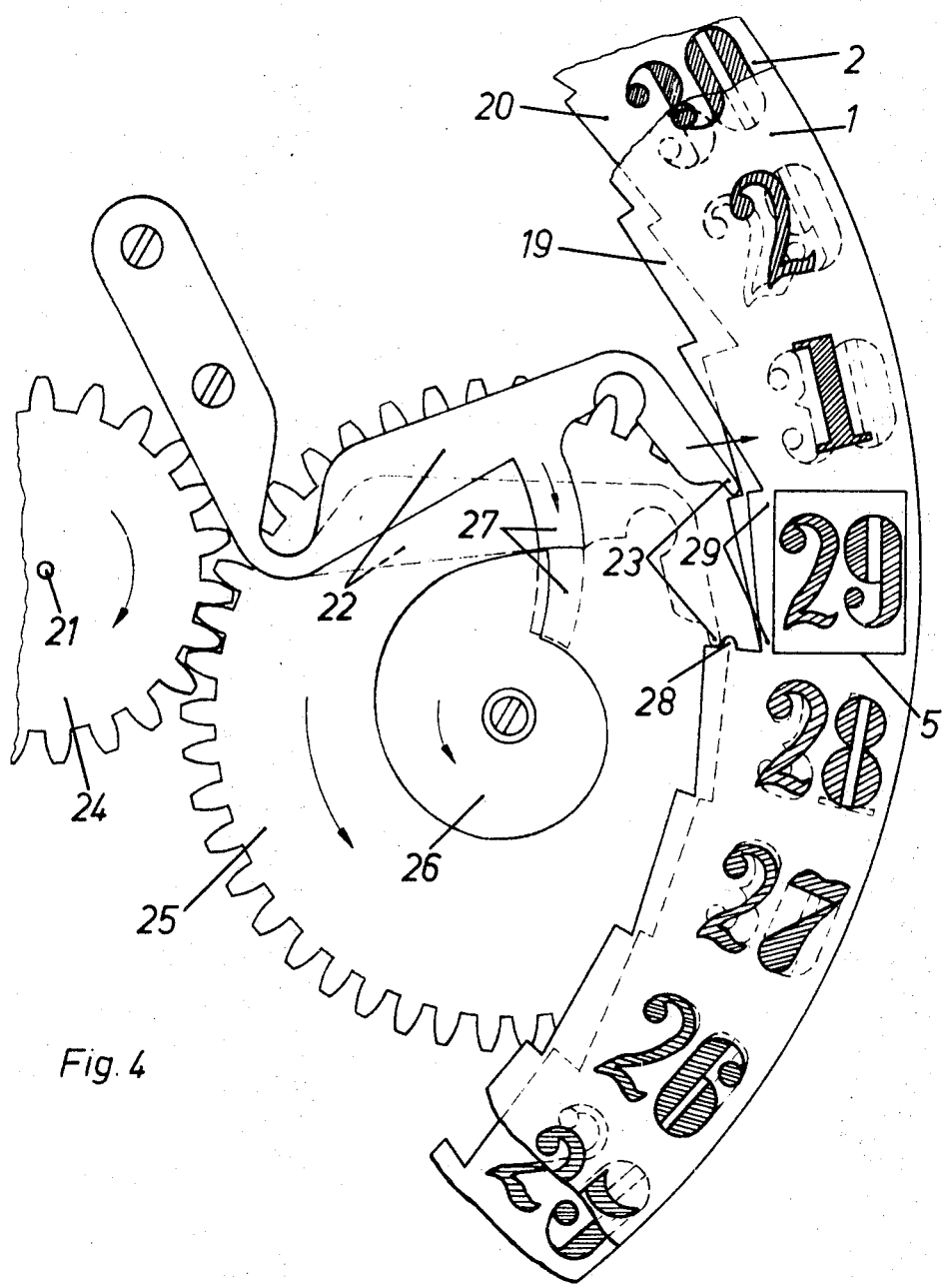
FIG. 4 is a fragmentary somewhat diagrammatic plan view of a timepiece provided with that embodiment of my invention for which the endless carriers have been shown in FIGS. 2 and 3.
Figure 5:
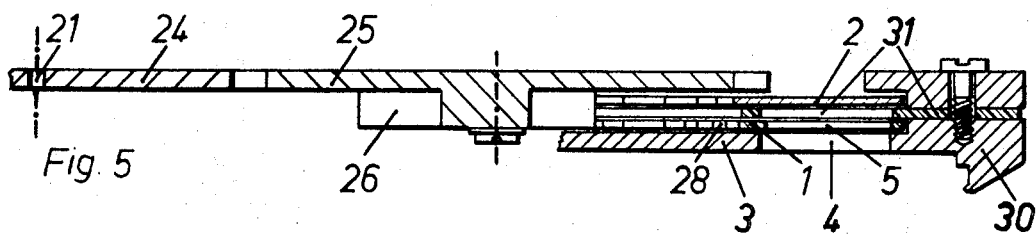
FIG. 5 is a sectional elevation of the embodiment shown in FIG. 4.

As FIGS. 4 and 5 show more clearly, the endless carriers 1 and 2 of FIGS. 2 and 3 are arranged in superimposed condition below the dial 3 so as to be both turnable about the axis of rotation 21, but independently of one another. The carrier 1 is the uppermost, that is, it is closest to the dial 3, and the carrier 2 is located below or behind the carrier 1. In accordance with the present invention, the uppermost carrier 1 is provided with a series or group of graduations in form of consecutive numbers from 1 to 28 which are, as clearly shown in FIG. 2, arranged in form of a circle concentric with the axis of rotation 21. Intermediate the numerals 1 and 28, that is in the location where the numeral 29 would be expected to be located, the carrier 1 is instead provided with a window 5 which is so positioned, it will be understood, that during rotation of the carrier 1, it can move into registry with the window 4 of the dial 3. The carrier 2, on the other hand, is also provided with numerals which are arranged in form of a ring concentric with the axis of rotation 21. The diameters of the carriers 1 and 2, and those of the respective rings of numerals provided thereon, are substantially identical.

Unlike the arrangement of numerals on the carrier 1, the numerals on the carrier 2 are subdivided into twelve groups, each of which corresponds to one month of the year. These groups are of different sizes and are identified with reference numerals 7–18 in FIG. 3. It will be seen that successive groups are arranged on the carrier 2 in counterclockwise direction, that is the group 7 is followed in counterclockwise direction by the group 8, the latter is followed in counterclockwise direction by the group 9, and so forth. The group 7 corresponds, of course, to the month of January, whereas the group 18 corresponds to the month of December. Each of the groups 7–18 comprises a plurality of graduations, that is in this instance numerals which correspond to those days of the respective month which are not to be found on the carrier 1. In other words, the numbering on the carrier 1 goes only up to 28; therefore, and because the month of January has 31 days, the group 7 on the carrier 2 comprises the numerals 29, 30 and 31. The month of February normally has 28 days; however, in leap years it has 29 days and provision for the 29th of February is therefore made by providing the group 8 on the carrier 2 with the numeral 29. All of the remaining groups are analogously composed.

With this arrangement the carrier 1 is rotated by itself about the axis 21 in a manner which will still be described in more detail. This rotation is intermittent, that is the carrier 1 is rotated each day through an angular distance sufficient to make the next-following one of the numerals appear in the window 4 of the dial 3. Thus, the numeral 29 will finally appear in the window 4, and in response to the next turning impulse, the carrier 1 will rotate further to a position where the window 5 thereof registers with the window 4 of the dial 3. During this rotation, that is during the preceding 28 days, the carrier 2 has been in a position in which the first date number of the respective month has been registering with the window 4 but has not been visible because it was covered by the carrier 1. If it is assumed that the month in question is the month of January, then it is clear that the first date numeral of the group 7 corresponding to the month of January will be the numeral 29. This numeral now becomes visible in the window 4 because the window 5 now registers with the window 4. The next advancing impulse affects only the carrier 2 while the carrier 1 remains stationary with its window 5 registering with the window 4 of the dial 3. The carrier 2, on the ohter hand, is turned so that the date numeral 30 of the group 7 appears in registry with the windows 4 and 5. Subsequently, the date numeral 31 will thus become visible. In response to the next advancing impulse, however, the carriers 1 and 2 will rotate as a unit so that now the date numeral 1 of the carrier 1 becomes visible in the window 4. It is clear, therefore, that the date numeral 29 of the month which has just started, that is the date numeral 29 of the group 8 in FIG. 3 which corresponds to the month of February, will now be located in registry with the window 4 but will be covered by the carrier 1 whose window 5 is no longer in registry with the window 4. The carrier 1 now continues its stepwise rotation until the window 5 is again in registry with the window 4 so that the numeral 29 of the group 8 becomes visible.

This continues throughout the year.

The rotation of the carriers 1 and 2 can be effected in a variety of ways. By way of example I have illustrated in FIGS. 4 and 5 one such possibility. In this illustrated embodiment, which utilizes the carriers 1 and 2 shown in FIGS. 2 and 3, the carriers 1 and 2 are provided on their inner circumferential marginal portions with respective annuli 19 and 20 of teeth. This is also shown in FIGS. 2 and 3. These teeth are engaged by a resilient jumper or impulse lever 22 which is movable between two operative positions, one of which is shown in FIG. 4 in solid lines whereas the other is shown in dashed lines. Once every day the lever 22 moves rapidly in downward direction as indicated by the arrow, that is from its full line position to its dashed line position in FIG. 4, and a slower movement in the opposite direction. This can be accomplished via various expedients, for example the arcuately curved cam disc 26 shown in FIG. 4. This disc or member 26 is rigid with a turnable gear 25 which is driven by a further gear 24 mounted on the shaft which drives the hour hand of the timepiece and which rotates about the axis 21. The direction of rotation of the gears 24 and 25 is indicated by the curved arrows associated with them. It should be understood that the ratio of gear teeth of the gears 24 and 25 is 1:2. Of course, rotation of the gear 25 and thereby of the cam disc 26 which moves in the same direction as the gear 25, deflects the resilient lever 22 in upward direction to the solid line position of FIG. 4, counter to its downwardly directed bias. Once the follower portion 27 of the lever 22 which rides on the periphery of the cam disc 27, moves beyond the free end of the periphery, there is nothing to resist downward movement of the lever 22 under its own bias to the dashed line position shown in FIG. 4. Such downward movement of course is rapid.

A projection 23 provided on the lever 22 is also resilient and has a tendency to move in radially outward direction as indicated by the radially outwardly pointing arrow associated with the projection 23 in FIG. 4. However, this outward movement could also be accomplished in other ways, for instance as a result of gravity, as a result of magnetic attraction or by way of other expedients.

As is clearly evident from FIGS. 2 and 3 as well as FIG. 4, the depth or length of the teeth in the annuli 19 and 20 differs, just as the height of the teeth differs. In other words, and this is clearly shown in the drawing, each of the annuli 19 and 20 has three different root diameters as well as three different tip diameters. The purpose of this will be clear when it is considered that, as the lever 22 moves upwardly to its solid line position in FIG. 4, the projection 23 will slide over the tooth flank with which it is at the moment associated so that it can snap into the next tooth to effect clockwise movement of the carrier 1, the carrier 2 or both of the carriers together as soon as the lever 22 can move under its own bias to the dashed line position of FIG. 4. Whether the carrier 1 is moved by itself, whether the carrier 2 is moved by itself, or whether both of the carriers are moved as a unit, depends upon the prevailing root diameter of the tooth or teeth with which the projection 23 of the lever 22 can engage, as well as the prevailing tip diameter. Those skilled in the art will readily appreciate that the tip diameters and the root diameters must be so selected as to obtain the desired movement of the respective carrier or carriers in order to arrive at the pattern of advancement which I have described above. It should be noted that the tooth associated with the window 5 of the carrier 1, that is the teeth which will be engaged when the carrier 1 is subjected to a movement which will displace the window 5 out of registry with the window 4, is provided with a nose or protuberance 28. As shown in the dashed line position of the lever 22, the projection 23 of the lever is thus not able to move radially outwardly to the full depth otherwise permitted by this tooth, because it will be engaged and prevented from such movement by the protuberance 28. This is necessary to prevent movement of the projection 23 radially outwardly to the full extent permitted by the tooth provided with the protuberance 28, because such movement would bring the projection 23 into engagement not only with this tooth, but also with the associated tooth of the carrier 2. This, on the other hand, would cause the carrier 2 to be moved simultaneously with the carrier 1 and the date numeral 29 would thus be moved out of registry with the window 4 when the window 5 is so moved. This, however, must not occur because it is necessary that the date numeral 29 be in position when the carrier 1 completes a full rotation and the window 5 again moves into registry with the window 4. Advantageously, both the carrier 1 and the carrier 2 will be provided with a suitable biasing means which will block undesired turning of the respective carriers opposite their intended direction of movement. Such biasing means may be so constructed, in accordance with features known to those skilled in the art, that they can serve for manual adjustment of the date indicating device should this become necessary or desirable.

As shown in FIG. 5 it may be advantageous to dispose a suitable anti-friction means between the carriers 1 and 2 so as to assure that they do not accidentally move in unison and to further assure that there is no friction between them. In the embodiment illustrated in FIGS. 4 and 5 this anti-friction means is assumed to be a foil 31 of a material, such as for example polytetrafluoroethylene, which has a low coefficient of friction, or a foil which is coated with such a material. It may be advantageous, as shown in FIG. 5, to connect this foil 31 with the wall 30 of the casing C.

As shown in FIG. 4, the two teeth of the carrier 1 which are associated with the window 5 therein, that is which are located in the immediate vicinity of the window 5, have maximum depth. Thus, if the window 5 is a cutout in the material of the carrier 1, the left wall portion bounding the window 5 will be weakened by the close approach of the roots of the two teeth to the window. Furthermore, this depth of the teeth in question, or rather of their roots 29, limits the size which can be selected for the window 5. This problem can be eliminated if the annuli 19 and 20 of teeth are turned with reference to the circles of date numerals, and thereby with reference to the window 5, about the axis of rotation 21 through any desired angle. It is then of course necessary that the arrangement of the lever 21 and the gear 25 be similarly displaced through the same angle. The determination of what angle to select for this purpose will of course normally take into account the existing space limitations and/or space advantages so as to obtain an advantageous arrangement.

It will be appreciated that the lever 22 may be replaced with another instrumentality capable of accomplishing the same function. For instance a rotating instrumentality may be used, or in place of the projection 23 a pivotable portion may be utilized which is pivotable in such a manner as to alternately engage the teeth of one or the other carrier, or both in an intermediate position.

In the arrangement thus far illustrated and described, it is necessary that in non-leap years a manual adjustment be effected on February 28th so as to skip an indication for February 29th. This necessity can be eliminated if the embodiment of FIGS. 6 and 7 is utilized. The carriers which are identified in FIGS. 6 and 7 with the reference numerals 1a and 2a, respectively, correspond in their construction to those carriers shown in FIGS. 2 and 3. The window in carrier 1a is identified with reference numeral 5a and corresponds to the window 5 in FIG. 2. Unlike the arrangement of FIGS. 2 and 3, however, the carrier 1a of FIG. 6 is provided only with date numerals from 1 to 27, whereas the groups of date numerals shown on the carrier 2a begin with date numeral 28, not with date numeral 29 as in the case of carrier 2 in FIG. 3. In this embodiment the device operates in the same manner as discussed above with respect to FIGS. 2–5. However, because of the different arrangement of the date numerals it is necessary, when the embodiment of FIGS. 6 and 7 is utilized, to manually adjust the date indicating device only in a leap year. Thus, the manual adjustment need take place only every fourth year rather than being omitted every fourth year and being required during the three years preceding as is the case in the embodiment utilizing the carriers 1 and 2 of FIGS. 2 and 3.

FIGS. 8 and 9 shows that the arrangement of the carriers can be reversed. In other words, the carrier 1b which corresponds to the carrier 1 of FIG. 2, may be the lowermost one which is farthest spaced from the dial 3, and the carrier 2b, which corresponds to the carrier 2 of FIG. 3, may be the uppermost one which is directly below the dial 3. To accomplish this the window 5 of the carrier 1 is replaced in the carrier 1b of FIG. 9 with the date numeral 29 so that the carrier 1b is provided with date numerals from 1 to 29. The carrier 2b, on the other hand, is again provided with twelve groups of date numerals corresponding to those of the carrier 2 in FIG. 3, except that the date numeral 29 in each instance is replaced by a window 2b'. In other words, the carrier 2b has twelve of these windows 2b', each window being associated with one of the groups which correspond to the groups 7–18 in FIG. 3. This arrangement corresponds, in its operation and in the frequency with which manual adjustment must be carried out, to the embodiment utilizing the carriers of FIGS. 2 and 3.

If it is desired to have an embodiment which corresponds in operation and frequency of manual adjustment to the embodiment utilizing the carriers of FIGS. 6 and 7, then resort may be had to the carrier construction shown in FIGS. 10 and 11. Here, the carriers are respectively identified with reference numerals 1c and 2c, and the windows in the carrier 2c are identified with reference nmerals 2c'. The carriesr 1c and 2c are identical with the carriers 1b and 2b of FIGS. 8 and 9 except for the fact that on the carrier 2c the date numerals go only from 1 to 28 whereas the groups of numerals on the carrier 2c begin with 29 as the lowest numeral and the windows 2c' are positioned at the locations of the carrier 2c where the date numeral 28 would otherwise take its place with reference to the respective group of numerals.

If it is desired to indicate not only the day of the month, but also the month itself, this can be accomplished in simple manner by providing on the carrier having the twelve groups an indication—by numeral, by abbreviated spelling of the month, or in other suitable manner—of the month which is associated with the respective group. In other words, in FIG. 3 the word January or a symbolic replacement therefor would be located adjacent—preferably laterally adjacent—the numerals 29, 30 and 31 of the group 7. Similarly, an indication of the month of February would be associated with the numeral 29 of the group 8. In this case it would, of course, be necessary to enlarge the windows 4 and 5 so that the month indication can also be seen, and it would be necessary to make the annular carriers wider or to utilize solid disc members. It is of course clear that separate windows could be provided, and that the month indications could be located spaced from the associated date numerals, if this should be desired. Of course, there must always be the aforementioned correlation between the month indication and the date numerals provided on the carrier 2 or analogous carrier.

Coming, finally, to he embodiment illustrated in FIGS. 12–15 it will be seen that this provides for a construction where not only the day and the month are indicated, but where the year is automatically shown and changed, and where any manual compensation for leap years is eliminated. This is accomplished by associating with the carriers 1d and 2d, which latter carries the month indications as outlined before, a third endless carrier 32 on which a series of year indications, here beginning with 1970 and ending with 1989, is arranged in a circle. Radially inwardly of those of the year indications which are concerned with non-leap years there is shown the date numeral 28, whereas the date numeral 29 is associated with those year indications which will be visible during leap years. The movement of the carrier 32 is controlled in the same manner as the movement of the carriers 2d and 1d, or 1 and 2 in FIGS. 2–5. In other words, whatever advancing arrangement is provided is caused to effect intermittent turning of the carrier 32 in a manner analogous to the one utilized for effecting relative movement of the carriers 1d and 2d, as well as movement of these carriers as a unit. In the illustrated embodiment it is the teeth of the carrier 2d which will control and initiate the stepwise movement of the carrier 32. In FIG. 15 the three carriers are shown in assembled condition and it will be seen that the window 14 is of course enlarged so as to make visible all of this information. Of course, if year indications are provided on the carrier 32, then it is necessary that the carriers 2d and/or 1d be similarly provided with properly configured windows, or that the carriers themselves be so constructed as to make the year indication visible in the window 4d of the dial 3. It will be appreciated, of course, that the year indications may also be left off in which case the carrier 32 will simply serve to automatically compensate for leap year changes so as to eliminate any need for manual adjustment of the device during a leap year or during the years between leap years.

Evidently, a variety of modifications is possible without departing in any way from the concept and scope of the invention. Thus, the windows may, for instance, be cutouts which are open at the inner or outer peripheral edge of the respective carriers. The annuli of teeth may be provided at the outer margins of the carriers, rather than on the inner margins, and the carriers themselves may be solid discs rather than annular members, or they may be tapes or other suitable endless carrier members. Clearly, the arrangement can be used not only in watches, as illustrated, but also in clocks, regardless of whether they be key wound, electrical or otherwise driven, they can be used in calendars which are not associated with timepieces, or they can be used in arrangements where it is not intended to indicate days or other dates, but rather to indicate quantities, bits of information constituting a series, or similar data.

It will be understood that each of the elements described above, or two or more together, may also find a useful application in other types of constructions differing from the types described above.

While the invention has been illustrated and described as embodied in a date indicating device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An indicating device, comprising, in combination, a pair of endless carriers one of which is arranged behind the other and both of which are mounted for advancement in a predetermined direction; a first group of graduations provided on said other carrier and representing a series of successive days of a month which are common to each month of a year; a window provided in said other carrier following the graduation representing the last day of said series; twelve groups of graduations provided on said one carrier, said twelve groups respectively, representing the consecutive months of a year and the graduations of each of said twelve groups representing the number of remaining days in the corresponding month in excess of the days represented by said series; and advancing means associated with said carriers and being operative for intermittently advancing both of said carriers as a unit in said predetermined direction for a period corresponding to the number of days represented in said series so that said graduations of said series successively arrive at an observation station, and for intermittently advancing only said one carrier relative to said other carrier in response to said window in the latter arriving at said observation station and for a period corresponding to the remaining number of days of a given month so that the graduations of the corresponding group are observable through said window.

2. A device as defined in claim 1. wherein said carriers are respective annular members mounted for turning movement about a common axis of rotation.

3. A device as defined in claim 1, wherein said carriers are respective disc members mounted for turning movement about a common axis of rotation.

4. A device as defined in claim 1, wherein said carriers are respective members of circular outline mounted for turning movement about a common axis.

5. A device as defined in claim 4, wherein said first group of graduations comprises consecutive numbers from one to twenty-eight arranged in a circle concentric with said axis.

6. A device as defined in claim 4, wherein said first group of graduations comprises consecutive numbers from one to twenty-seven arranged in a circle concentric with said axis.

7. A device as defined in claim 4, wherein said carriers each have a toothed circumferential marginal portion; and wherein said advancing means comprises an angled resilient impulse lever adapted to intermittently engage the toothed marginal portions for effecting turning of the respective carriers about said axis.

8. A device as defined in claim 4, wherein said carriers each have a marginal circumferential portion provided with a plurality of teeth, the teeth of each portion being circumferentially spaced by distances corresponding to the spacing between said graduations on the associated carrier; and wherein said advancing means comprises engaging means adapted to mesh with respective ones of said teeth for effecting intermittent turning of the respective carriers about said axis.

9. A device as defined in claim 7, wherein the teeth of the respective carriers are each associated with one of said graduations of the respective carrier, and wherein all of the teeth provided on the circumferential marginal portion of one of said carriers except a given tooth associated with the graduation representing the first day of a month project radially beyond the teeth provided on the circumferential marginal portion of the other of said carriers, all of the teeth of the other of said carriers projecting radially beyond said given tooth, and wherein such predetermined teeth of the other of said carriers which are respectively associated with that graduation of each of said twelve groups which represents the final day of the respective one of the twelve groups, have a radial depth which exceeds that of all other teeth except for said given tooth and that one tooth of said one carrier which precedes said given tooth.

10. A device as defined in claim 9; further comprising a detent projection provided on that one tooth of said one carrier which precedes said given tooth and arranged so as to prevent engagement of said resilient impulse lever with the teeth of the other of said carriers when said impulse lever engages said one tooth.

11. A device as defined in claim 1; and further comprising twelve further groups of graduations provided on said one carrier and each associated with the graduations of one of said twelve groups, the graduations of each of said further groups indicating the month associated with the associated one of said twleve groups and being arranged so as to be visible in said window when a graduation of the associated one of said twelve groups is visible in said window.

12. A device as defined in claim 1, wherein said one carrier is also provided with an observation window; and further comprising an additional endless carrier arranged behind said one carrier and provided with indicia indicative of a successive series of years, said additional carrier being constructed and arranged for cooperation with said advancing means so as to effect automatic relative adjustment of said carriers in a sense advancing the indicia indicative of a given year into registry with said windows and so as to compensate for leap year variations.

13. A device as defined in claim 1; and further comprising anti-friction means arranged between said carriers.

14. A device as defined in claim 13, and anti-friction means comprising a foil consisting at least in part of a material having a low coefficient of friction.

15. A device as defined in claim 14, wherein said material is polytetrafluoroethylene.

16. An indicating device, comprising, in combination, a pair of endless carriers one of which is arranged behind the other and both of which are mounted for advancement in a predetermined direction; opaque stationary cover means provided in front of said other carrier and having a first observation window affording a view of a restricted portion of said other carrier; a first group of graduations provided on said one carrier and representing the days of the month from one to at least twenty-eight; twelve additional groups of graduations provided on said other carrier, said twelve groups respectively representing the consecutive months of a year and the graduations of each of said twelve groups representing the number of remaining days in the corresponding month in excess of the days represented by said first group; twelve additional windows provided in said other carrier each located intermediate two successive ones of said twelve groups and each associated with one of said groups; and advancing means associated with said carriers and being operative for intermittently advancing said one carrier relative to said other carrier in said predetermined direction for a period corresponding to the number of days represented by said first group so that the graduations of the same become successively visible in said first window and that one of said additional windows which is associated with a given additional group corresponding to the given month and which is aligned with said first window during such advancement of said one carrier, and for intermittently advancing said other carrier in said predetermined direction and relative to said one carrier for a period corresponding to the remaining number of days of said given month in response to that graduation of said first group which corresponds to the final day represented by said first group becoming visible in said first and said one additional window, so that the graduations of said given additional group become visible in said first window.

References Cited

UNITED STATES PATENTS 2,764,828  10/1956  Wolaver _____ 58—4

FOREIGN PATENTS 957,031  5/1964  Great Britain.

RICHARD B. WILKINSON, Primary Examiner

EDITH C. SIMMONS, Assistant Examiner

U.S. Cl. X.R.

40—113; 58—5